United States Patent
Gao et al.

(10) Patent No.: US 10,824,885 B2
(45) Date of Patent: Nov. 3, 2020

(54) METHOD AND APPARATUS FOR DETECTING BRAKING BEHAVIOR OF FRONT VEHICLE OF AUTONOMOUS VEHICLE

(71) Applicant: Baidu Online Network Technology (Beijing) Co., Ltd., Beijing (CN)

(72) Inventors: Han Gao, Beijing (CN); Tian Xia, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 100 days.

(21) Appl. No.: 16/049,152

(22) Filed: Jul. 30, 2018

(65) Prior Publication Data

US 2019/0087674 A1 Mar. 21, 2019

(30) Foreign Application Priority Data

Sep. 18, 2017 (CN) .......................... 2017 1 0842627

(51) Int. Cl.
*G06K 9/00* (2006.01)
*G06K 9/32* (2006.01)
(Continued)

(52) U.S. Cl.
CPC ....... *G06K 9/00825* (2013.01); *G06K 9/3233* (2013.01); *G06K 9/4652* (2013.01); *G06K 9/6281* (2013.01); *G06T 5/00* (2013.01); *G06T 7/62* (2017.01); *G06T 2207/10024* (2013.01); *G06T 2207/30252* (2013.01)

(58) Field of Classification Search
CPC ............ G06K 9/00825; G06K 9/4652; G06K 9/3233; G06T 5/00
See application file for complete search history.

(56) References Cited

U.S. PATENT DOCUMENTS

2013/0177205 A1 7/2013 Kasaoki
2016/0140402 A1* 5/2016 Smith ................ G06K 9/00798
382/104

(Continued)

FOREIGN PATENT DOCUMENTS

CN 102717785 A 10/2012
CN 103121423 A 5/2013
(Continued)

*Primary Examiner* — John J Lee
(74) *Attorney, Agent, or Firm* — Nixon Peabody LLP

(57) ABSTRACT

Embodiments of the present disclosure disclose a method and apparatus for detecting a braking behavior of a front vehicle of an autonomous vehicle. A specific implementation of the method comprises: extracting a vehicle image from a vehicle area in an image acquired by the image acquisition device; converting a color space of the vehicle image to generate a first vehicle image; setting a pixel value of a pixel point in the first vehicle image meeting any condition in a preset condition group to a first preset value to generate a second vehicle image; analyzing the second vehicle image to determine a candidate vehicle light area group; and detecting, based on the candidate vehicle light area group, whether a vehicle indicated by the vehicle image is braking, and generating a detection result. The implementation improves the detection efficiency for the braking behavior of the front vehicle.

13 Claims, 5 Drawing Sheets

(51) Int. Cl.
*G06T 5/00* (2006.01)
*G06K 9/46* (2006.01)
*G06K 9/62* (2006.01)
*G06T 7/62* (2017.01)

(56) References Cited

U.S. PATENT DOCUMENTS

2018/0114299 A1* 4/2018 Hattori ................ G06T 7/90
2018/0247505 A1* 8/2018 Arai ............... G08B 13/19602

FOREIGN PATENT DOCUMENTS

| | | |
|---|---|---|
| CN | 103927548 A | 7/2014 |
| CN | 103984950 A | 8/2014 |
| CN | 106407951 A | 2/2017 |
| KR | 20150125818 A | 11/2015 |

* cited by examiner

METHOD AND APPARATUS FOR DETECTING BRAKING BEHAVIOR OF FRONT VEHICLE OF AUTONOMOUS VEHICLE

CROSS-REFERENCE TO RELATED APPLICATIONS

This application claims priority to Chinese Patent Application no. 201710842627.5, filed with the State Intellectual Property Office of the People's Republic of China (SIPO) on Sep. 18, 2017, the content of which is incorporated herein by reference in its entirety.

TECHNICAL FIELD

The present disclosure relates to the field of vehicle, specifically to the field of autonomous vehicle technology, and more particularly to a method and apparatus for detecting a braking behavior of a front vehicle of an autonomous vehicle.

BACKGROUND

An autonomous vehicle is a novel intelligent vehicle, also known as a "wheeled mobile robot," which realizes fully automatic operation of a vehicle mainly by accurately controlling, algorithmically analyzing various parts of the vehicle through an electronic control unit (ECU), i.e., a vehicle-mounted controller system, to achieve autonomous of the vehicle.

In order to ensure safe driving of the autonomous vehicle, it is especially important to detect the braking behavior of the front vehicle of the autonomous vehicle. At present, judging whether a vehicle is decelerating or braking is usually achieved by predicting the speed of a target vehicle through target tracking, and then judging whether the target vehicle is braking on the basis of the speed. However, due to a limited scope of observation, the tracking has not functioned normally in the first several frames in which the target vehicle appears, and it is usually impossible to determine whether the target vehicle is braking.

SUMMARY

The object of embodiments of the present disclosure is to provide an improved method and apparatus for detecting a braking behavior of a front vehicle of an autonomous vehicle to solve a part of the technical problems mentioned in the above Background.

In a first aspect, the embodiments of the present disclosure provide a method for detecting a braking behavior of a front vehicle of an autonomous vehicle, and the method includes: extracting a vehicle image from a vehicle area in an image acquired by the image acquisition device; converting a color space of the vehicle image to generate a first vehicle image; setting a pixel value of a pixel point in the first vehicle image meeting any condition in a preset condition group to a first preset value to generate a second vehicle image; analyzing the second vehicle image to determine a candidate vehicle light area group; and detecting, based on the candidate vehicle light area group, whether a vehicle indicated by the vehicle image is braking, and generating a detection result.

In some embodiments, the converting a color space of the vehicle image includes: converting the color space of the vehicle image into a Hue-Saturation-Value color space.

In some embodiments, the pixel value of the pixel point includes a hue, a saturation, and a value, and the preset condition group comprises at least one of: the hue is not within a preset interval, the saturation is less than a first threshold, or the value is less than a second threshold.

In some embodiments, the analyzing the second vehicle image to determine a candidate vehicle light area group includes: analyzing a connected area of the second vehicle image to obtain the candidate vehicle light area group.

In some embodiments, the detecting, based on the candidate vehicle light area group, whether a vehicle indicated by the vehicle image is braking includes: for each candidate vehicle light area in the candidate vehicle light area group, determining a coordinate of a center point of the candidate vehicle light area and a size of the candidate vehicle light area on the basis of the coordinate of the pixel point included in the candidate vehicle light area, and classifying the candidate vehicle light area into a vehicle light area set if the candidate vehicle light area meets a first preset condition, wherein the coordinate of the pixel point includes an X coordinate value and a Y coordinate value, and the first preset condition includes that the Y coordinate value of the center point is not lower than a product of a height value of the vehicle image and a second preset value, and a ratio of the size of the candidate vehicle light area to the size of the vehicle image is greater than a third threshold; determining whether a first target vehicle light area and a second target vehicle light area exist in the vehicle light area set, wherein both the ratio of the size of the first target vehicle light area to the size of the vehicle image and the ratio of the size of the second target vehicle light area to the size of the vehicle image are greater than a fourth threshold, an absolute value of the difference between the Y coordinate value of the center point of the first target vehicle light area and the Y coordinate value of the center point of the second target vehicle light area is less than a fifth threshold, and the X coordinate value of the center point of the first target vehicle light area and the X coordinate value of the center point of the second target vehicle light area meet one, but a different one of: not greater than a product of a width value of the vehicle image and a third preset value, or not less than a product of the width value and a fourth preset value; and determining that the vehicle is not braking if the first target vehicle light area and the second target vehicle light area do not exist in the vehicle light area set.

In some embodiments, the detecting, based on the candidate vehicle light area group, whether a vehicle indicated by the vehicle image is braking further includes: determining a midpoint of a line connecting the center point of the first target vehicle light area and the center point of the second target vehicle light area if the first target vehicle light area and the second target vehicle light area exist in the vehicle light area set; and searching for a third target vehicle light area vertically upward from the midpoint in the second vehicle image, and determining that the vehicle is braking if the third target vehicle light area is found.

In a second aspect, the embodiments of the present disclosure provide an apparatus for detecting a braking behavior of a front vehicle of an autonomous vehicle, and the apparatus including: an extraction unit configured for extracting a vehicle image from a vehicle area in an image acquired by the image acquisition device; a first generation unit configured for converting a color space of the vehicle image to generate a first vehicle image; a second generation unit configured for setting a pixel value of a pixel point in the first vehicle image meeting any condition in a preset condition group to a first preset value to generate a second vehicle image; a determination unit configured for analyzing the second vehicle image to determine a candidate vehicle light area group; and a detection unit configured for detecting, based on the candidate vehicle light area group, whether a vehicle indicated by the vehicle image is braking, and generating a detection result.

In some embodiments, the first generation unit includes: a converting subunit configured for converting the color space of the vehicle image into a Hue-Saturation-Value color space.

In some embodiments, the pixel value of the pixel point includes a hue, a saturation, and a value, and the preset condition group includes at least one of: the hue is not within a preset interval, the saturation is less than a first threshold, or the value is less than a second threshold.

In some embodiments, the determination unit includes: a determination subunit configured for analyzing a connected area of the second vehicle image to obtain the candidate vehicle light area group.

In some embodiments, the detection unit includes: a processing subunit configured for, for each candidate vehicle light area in the candidate vehicle light area group, determining a coordinate of a center point of the candidate vehicle light area and a size of the candidate vehicle light area on the basis of the coordinate of the pixel point included in the candidate vehicle light area, and classifying the candidate vehicle light area into a vehicle light area set if the candidate vehicle light area meets a first preset condition, wherein the coordinate of the pixel point includes an X coordinate value and a Y coordinate value, and the first preset condition includes that the Y coordinate value of the center point is not lower than a product of a height value of the vehicle image and a second preset value, and a ratio of the size of the candidate vehicle light area to the size of the vehicle image is greater than a third threshold; a first determination subunit configured for determining whether a first target vehicle light area and a second target vehicle light area exist in the vehicle light area set, wherein both the ratio of the size of the first target vehicle light area to the size of the vehicle image and the ratio of the size of the second target vehicle light area to the size of the vehicle image are greater than a fourth threshold, an absolute value of the difference between the Y coordinate value of the center point of the first target vehicle light area and the Y coordinate value of the center point of the second target vehicle light area is less than a fifth threshold, and the X coordinate value of the center point of the first target vehicle light area and the X coordinate value of the center point of the second target vehicle light area meet one, but a different one of: not greater than a product of a width value of the vehicle image and a third preset value, or not less than a product of the width value and a fourth preset value; and a second determination subunit configured for determining that the vehicle is not braking if the first target vehicle light area and the second target vehicle light area do not exist in the vehicle light area set.

In some embodiments, the detection unit further includes: a third determination subunit configured for determining a midpoint of a line connecting the center point of the first target vehicle light area and the center point of the second target vehicle light area if the first target vehicle light area and the second target vehicle light area exist in the vehicle light area set; and a search subunit configured for searching for a third target vehicle light area vertically upward from the midpoint in the second vehicle image, and determining that the vehicle is braking if the third target vehicle light area is found.

In a third aspect, the embodiments of the present application provide an electronic device including: one or more processors, and a storage device for storing one or more programs, and when the one or more programs are executed by the one or more processors, the one or more processors implement the method described in any implementation in the first aspect.

In a fourth aspect, the embodiments of the present disclosure provide a computer readable storage medium on which computer programs are stored, and when the programs are executed by the processors, the method as described in any implementation in the first aspect is implemented.

According to the method and apparatus for detecting a braking behavior of a front vehicle of an autonomous vehicle, provided by the embodiments of the present disclosure, a vehicle image is extracted from a vehicle area in an image acquired by an image acquisition device to facilitate color space conversion of the vehicle image to generate a first vehicle image. Then, a pixel value of a pixel point in the first vehicle image meeting any condition in a preset condition group is set to a first preset value to generate a second vehicle image. Then, a candidate vehicle light area group is determined by analyzing the second vehicle image to facilitate detecting, based on the candidate vehicle light area group, whether a vehicle indicated by the extracted vehicle image is braking and generating a detection result. Thus, the extraction of the vehicle image, the generation of the first vehicle image and the second vehicle image, and the determination of the candidate vehicle light area group are effectively utilized, and the detection efficiency for the braking behavior of the front vehicle is improved.

BRIEF DESCRIPTION OF THE DRAWINGS

Other features, objects and advantages of the present application will become more apparent by reading a detailed description of the nonrestrictive embodiments made with reference to the following drawings.

DETAILED DESCRIPTION OF EMBODIMENTS

The present application will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
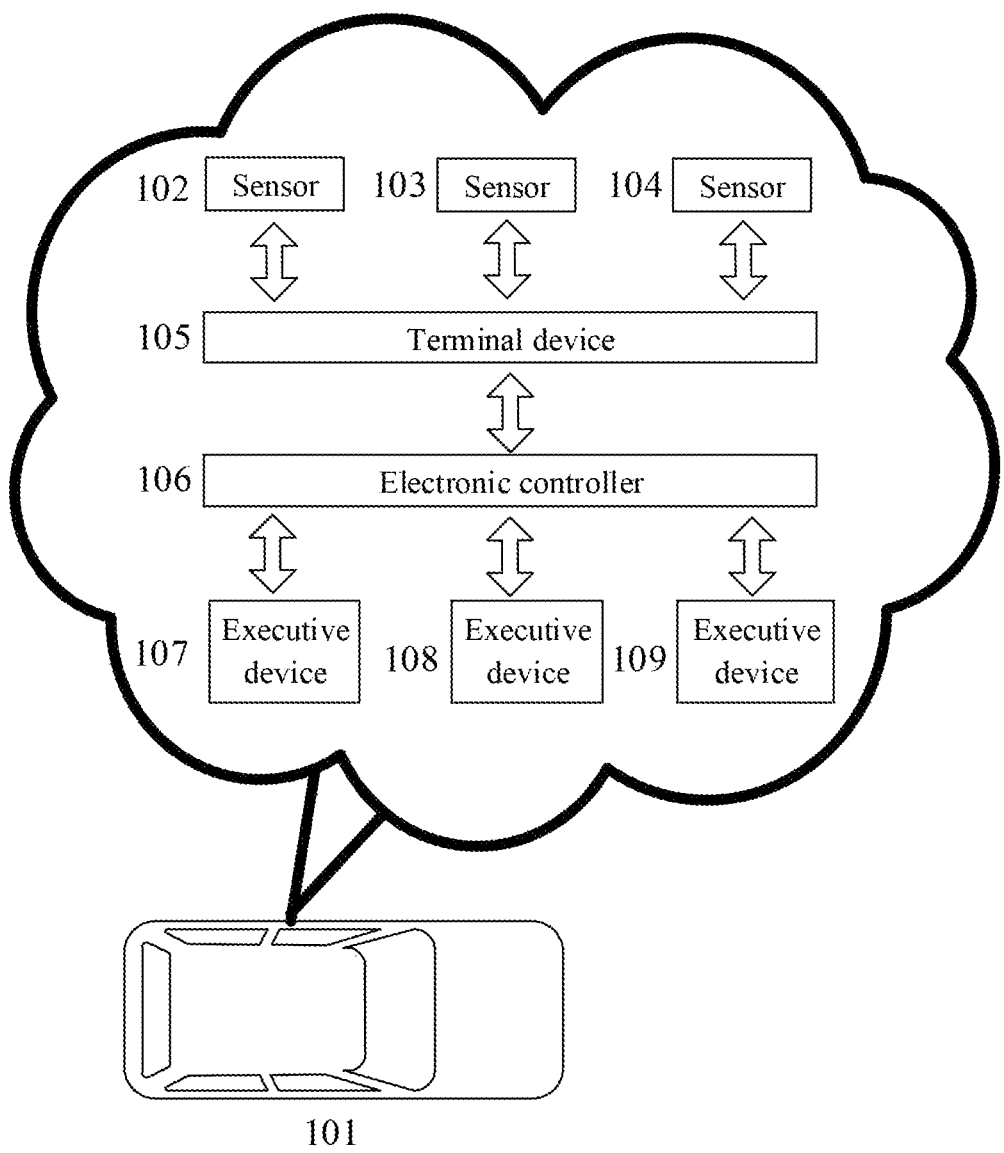
FIG. 1 is an illustrative system architecture diagram to which the present disclosure can be applied.

FIG. 1 shows an illustrative architecture of a system 100 which may be used by a method for detecting a braking behavior of a front vehicle of an autonomous vehicle or an apparatus for detecting a braking behavior of a front vehicle of an autonomous vehicle according to the embodiments of the present application.

As shown in FIG. 1, the architecture of the system 100 includes an autonomous vehicle 101. The autonomous vehicle 101 may be equipped with sensors 102, 103 and 104, a terminal device 105, an electronic control unit (ECU) 106, and actuators 107, 108 and 109.

The sensors 102, 103 and 104 may be in communication with the terminal device 105. The terminal device 105 may be in communication with the electronic control unit 106, and the electronic control unit 106 may be in communication with the actuators 107, 108 and 109. Here, the manner through which the terminal device 105 connects the electronic control unit 106 may be a CAN (controller area network) bus connection. The high performance and reliability of the CAN bus have been widely recognized. Therefore, at present, a commonly used vehicle bus in motor vehicles is the CAN bus. Of course, it should be appreciated that the vehicle bus may also be other bus types.

The sensors 102, 103 and 104 may encompass various sensors, for example, including but not limited to, an image acquisition device (e.g., a camera), a laser radar, a millimeter wave radar. Here, the image acquisition device may acquire images, while the laser radar may be used for self-positioning, collecting a surrounding environment, and the like. The millimeter wave radar refers to a radar that is capable of operating in a millimeter wave band, and may be used for detecting an obstacle. The camera may be used for imaging surrounding vehicles (e.g., a front vehicle) of the autonomous vehicle 101.

The terminal device 105 may be responsible for overall intelligent control of the whole autonomous vehicle. The terminal device 105 may be a stand-alone controller, such as a programmable logic controller (PLC), a microcontroller, or an industrial control machine, it may also be another equipment having I/O ports and composed of electronic components with a computing and controlling function, and it may also be a computer device including an installed vehicle driving control application. The terminal device 105 may acquire data collected by the sensors 102, 103 and 104, analyze and process the acquired data, make appropriate decisions, and send instructions matching the decisions to the electronic control unit 106.

The electronic control unit 106 may also be known as a driving computer, on-board brain or driving computer etc. It usually includes a microprocessor, a memory, an I/O interface, an A/D converter, and a large scale integration circuit, such as a shaping circuit and a driving circuit. The electronic control unit 106 may receive control instructions sent by the terminal device 105, analyze and process the control instructions, and send the processed control instructions to a corresponding actuator 107, 108 or 109 to execute corresponding operations.

In practice, the electronic control unit 106 may include controllers such as a vehicle control unit (VCU), a battery management system (BMS), a motor control unit (MCU), an electric power steering system (EPS), and an electronic stability program (ESP).

The actuators 107, 108 and 109 may operate according to the control parameters in the control instructions. The actuators 107, 108 and 109 may include a brake device, a throttle, an engine, and the like.

It should be noted that the method for detecting a braking behavior of a front vehicle of an autonomous vehicle according to the embodiments of the present disclosure is generally executed by the terminal device 105. Accordingly, the apparatus for detecting a braking behavior of a front vehicle of an autonomous vehicle is generally installed on the terminal device 105.

It should be appreciated that the numbers of the autonomous vehicles, the terminal devices, the sensors, the electronic control units and the actuators in FIG. 1 are merely illustrative. Any number of autonomous vehicles, terminal devices, sensors, electronic control units and actuators may be provided based on the actual requirements.

Figure 2:
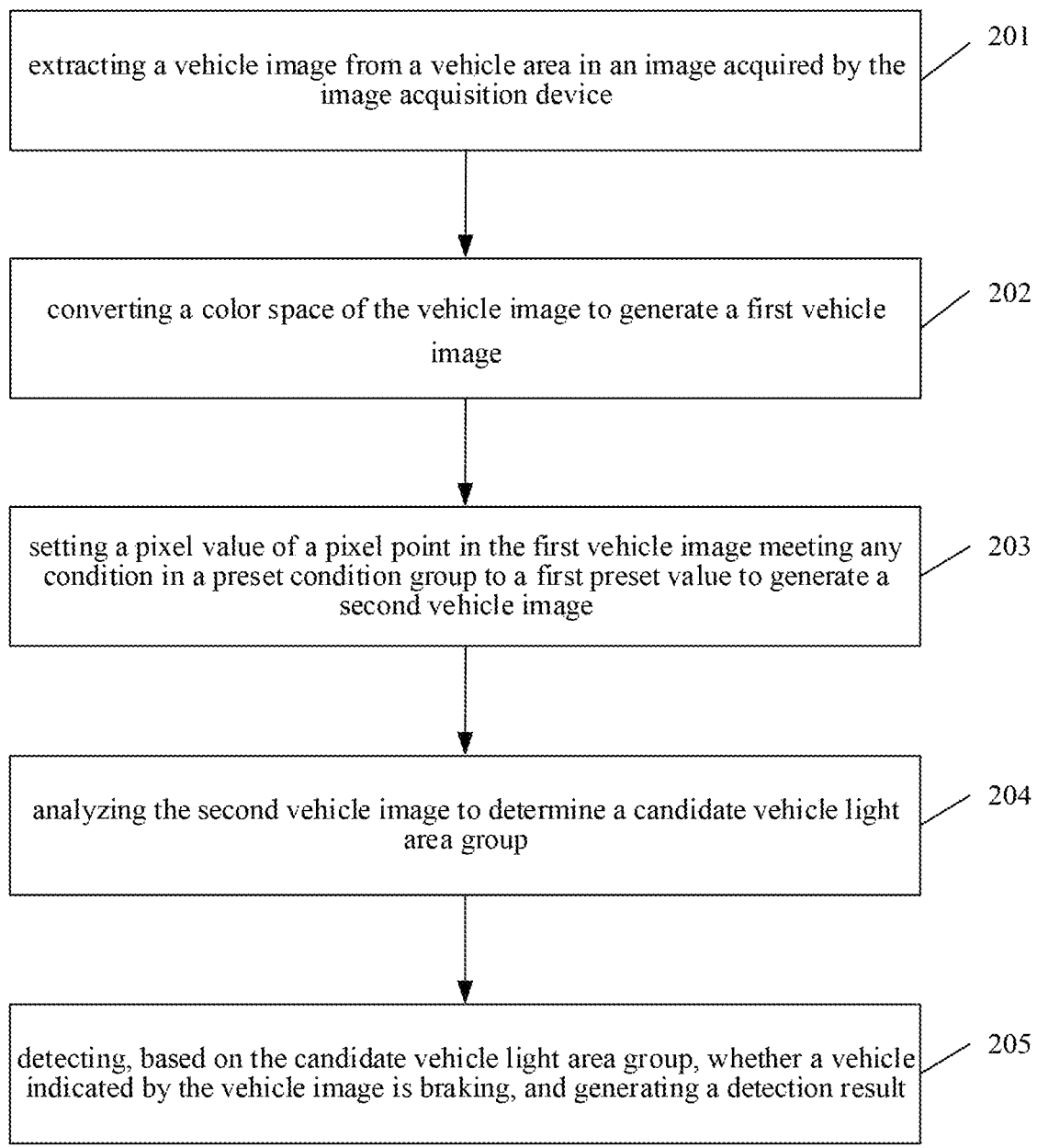
FIG. 2 is a flow diagram of an embodiment of the method for detecting a braking behavior of a front vehicle of an autonomous vehicle according to the present disclosure.

Further referring to FIG. 2, a flow 200 of an embodiment of the method for detecting a braking behavior of a front vehicle of an autonomous vehicle according to the present disclosure is shown. The flow 200 of the method for detecting the braking behavior of the front vehicle of the autonomous vehicle includes:

Step 201, extracting a vehicle image from a vehicle area in an image acquired by the image acquisition device.

In the present embodiment, an electronic device (e.g., a terminal device 105 shown in FIG. 1) on which the method for detecting the braking behavior of the front vehicle of the autonomous vehicle runs can receive the image acquired by the connected image acquisition device. Here, the image acquisition device may be, for example, a camera for photographing a front vehicle of the autonomous vehicle, on which the camera is located. The electronic device can extract a vehicle image from a vehicle area in an image acquired by the image acquisition device.

As an example, the image acquisition device and the electronic device can be communicatively connected to an image detection device, respectively. The image detection device can be used to detect whether the image acquired by the image acquisition device includes a vehicle area and send a detection result to the electronic device. The detection result for the image including the vehicle area may include position information of the vehicle area, for example. The detection result for an image not including the vehicle area may include, for example, information indicating that no vehicle area exists. For the image including a vehicle area, the electronic device may extract a vehicle image from the vehicle area on the basis of the position information in the detection result corresponding to the image. For example, according to the position information of the vehicle area, the electronic device cuts the vehicle area to obtain the vehicle image. It should be noted that the position information of the vehicle area may include, for example, a coordinate of an upper left vertex and a lower right vertex of the vehicle area, or a coordinate of an upper right vertex and a lower left vertex. Of course, the position information may also include a height value and/or a width value of the vehicle area.

For another example, the electronic device may store a pre-trained vehicle image extraction model locally, and the vehicle image extraction model may be used to detect whether a received image includes a vehicle area, extract a vehicle image from the vehicle area when the vehicle are is detected, and output the vehicle image. The vehicle image extraction model may be, for example, a convolutional neural network model, and the present embodiment does not limit the content of this aspect. The electronic device can use the vehicle image extraction model to extract the vehicle image from the vehicle area included in the image.

Step 202, converting a color space of the vehicle image to generate a first vehicle image.

In the present embodiment, after extracting the vehicle image, the electronic device can convert the color space of the vehicle image to generate the first vehicle image. An original color space of the vehicle image may be a red-green-blue color space, i.e., RGB color space. R is an abbreviation for red and can represent red; G is an abbreviation for green and can represent green; and B is an abbreviation for blue and can represent blue. Here, the RGB color space is based on the three basic colors red, green, and blue, realizes superposition at different levels to produce various extensive colors, so that the RGB color space is commonly known as a three-primary-color mode.

As an example, the electronic device can convert the extracted vehicle image from the RGB color space to a Hue-Saturation-Intensity color space, i.e., the HSI color space. H is an abbreviation for hue and can represent hue; S is an abbreviation for saturation and can represent saturation, and I is an abbreviation for intensity and can represent intensity. It should be noted that the HSI color space is usually based on a human visual system and uses hue, saturation, and intensity to describe colors. The HSI color space can be described by using a conic space model.

It should be pointed out that the conversion from the RGB color space to the HSI color space is usually a conversion from a unit cube based on the Cartesian rectangular coordinate system to a bipyramid based on the cylindrical polar coordinate system. The basic requirement usually is that luminance factor in the RGB color space is separated, the chromaticity is decomposed into the hue and the saturation, and the hue is represented by an angular vector. Since the method for converting from an RGB color space to an HSI color space is a well-known technology widely studied and applied at present, the method will not be described here.

In some optional implementations of the present embodiment, the electronic device can convert the color space of the extracted vehicle image to a Hue-Saturation-Value color space, i.e., the HSV color space. H is an abbreviation for hue and can represent hue; S is an abbreviation for saturation and can represent saturation, and V is an abbreviation for value and can represent value. It should be noted that the HSV color space is a color space created according to intuitive characteristics of colors, and is also called a hexagonal pyramid model.

Here, an algorithm for converting the RGB color space to the HSV color space is as follows:

$$\max=\max(R,G,B);$$

$$\min=\min(R,G,B);$$

$$V=\max(R,G,B);$$

$$S=(\max-\min)/\max;$$

if $(R=\max)H=(G-B)/(\max-\min)\times 60;$ if $(G=\max)H=120+(B-R)/(\max-\min)\times 60;$ if $(B=\max)H=240+(R-G)/(\max-\min)\times 60;$ if $(H<0)H=H+360.$ In the RGB color space, the pixel value of the pixel point can be represented by a vector that includes R, G, and B components. In the HSV color space, the pixel value of the pixel point can be represented by a vector that includes H, S, and V components. In the algorithm, the variable max is equivalent to the component with the largest value among R, G, and B, and the variable min is equivalent to the component with the smallest value among R, G, and B.

If means "in the event that." Taking a formula if (R=max) H=(G−B) (max−min)×60 as an example, the meaning of the formula is: in the event that R=max, H=(G−B)/(max−min)× 60.

Step 203, setting a pixel value of a pixel point in the first vehicle image meeting any condition in a preset condition group to a first preset value to generate a second vehicle image.

In the present embodiment, after generating the first vehicle image, the electronic device can set the pixel value of the pixel point in the first vehicle image meeting any condition in a preset condition group to a first preset value to generate a second vehicle image.

As an example, in the HSI color space, the pixel value of the pixel point may be represented by a vector that includes H (i.e., hue), S (i.e., saturation), and I (i.e., intensity) components. If the electronic device converts the color space of the extracted vehicle image into the HSI color space, the preset condition group may include, for example, at least one of: the hue is not within a first preset interval, the saturation is lower than a saturation threshold, or the intensity value is lower than an intensity threshold. Here, the hue may be a value of the pixel point under the H component; the saturation may be a value of the pixel point under the S component; and the intensity value may be a value of the pixel point under the I component.

It should be noted that brake lights of a vehicle usually locate at the rear of the vehicle and consist of a pair of left and right brake lights and a high-position brake light. The left and right brake lights have large size and high brightness. The high-position brake light is usually mounted at the upper part of the rear of the vehicle, and is usually a strip light. According to an international standard, the color of the brake lights of the vehicle are usually red. Therefore, the color corresponding to the hue in the first preset interval may be red. In addition, the first preset value may be, for example, a vector including H, S, and I components, and the color corresponding to the first preset value may be, for example, black. By setting the pixel value of the pixel point meeting the preset condition to the first preset value, the electronic device can highlight the area where a vehicle light is located in the vehicle image.

It should be noted that the first preset value, the first preset interval, the saturation threshold, and the intensity threshold can be modified according to actual needs, and the present embodiment does not limit the content of this aspect.

In some optional implementations of the present embodiment, if the electronic device converts the color space of the extracted vehicle image into the HSV color space, the preset condition group may include, for example, at least one of: the hue is not within a preset interval, the saturation is lower than a first threshold, or the value is lower than a second threshold. Furthermore, the first preset value may be, for example, a vector including three components H, S, and V, and the values of the three components are, for example, zero. It should be noted that the color corresponding to the hue in the preset interval may be, for example, red. The color corresponding to the first preset value may be, for example, black. Here, the preset interval may be, for example, [20, 160] or the like, the first threshold may be, for example, 100 or the like, and the second threshold may be, for example, 200 or the like. It should be noted that the preset interval, the first threshold, and the second threshold can be modified according to actual needs, and the present embodiment does not limit the content of this aspect.

Step 204, analyzing the second vehicle image to determine a candidate vehicle light area group.

In the present embodiment, after generating the second vehicle image, the electronic device can analyze the second vehicle image to determine the candidate vehicle light area group. As an example, if the electronic device converts the color space of the extracted vehicle image to the HSI color space in step 202, the electronic device can classify pixel points with the hue in the first preset interval and close to each other in the second vehicle image into a given candidate vehicle light area to obtain the candidate vehicle light area group.

In some optional implementations of the present embodiment, the electronic device can analyze a connected area of the second vehicle image to obtain the candidate vehicle light area group. It should be noted that the connected area generally refers to an image area composed of foreground pixel points with identical pixel values and adjacent positions in the image. Analyzing the connected area usually refers to finding and marking each connected area in the image.

It should be noted that the algorithm for analyzing the connected area may include a Two-Pass algorithm, a Seed-Filling algorithm, etc. The Two-Pass algorithm refers to that by scanning the image twice, all connected areas in the image can be found and marked. The Seed-Filling algorithm is derived from computer graphics and is often used to fill a graph. The summary of the Seed-Filling algorithm may include: selecting a foreground pixel point as a seed, then merging foreground pixels adjacent to the seed into a given pixel set according to two basic conditions (same pixel values and adjacent positions) of the connected area, and finally obtaining a pixel set as a connected area. Since the Two-Pass algorithm and the Seed-Filling algorithm are well-known technologies that are widely studied and applied at present, they will not be repeated here.

Step 205, detecting, based on the candidate vehicle light area group, whether a vehicle indicated by the vehicle image is braking, and generating a detection result.

In the present embodiment, after determining the candidate vehicle light area group, the electronic device can detect, based on the candidate vehicle light area group, whether the vehicle indicated by the extracted vehicle image is braking, and generate a detection result. The detection result may include, for example, prompt information which may be, for example, information prompting that the vehicle is not braking or is braking.

As an example, the electronic device can determine whether the vehicle is braking by the following steps.

First, for each candidate vehicle light area in the candidate vehicle light area group, the electronic device can determine the coordinate of the center point of the candidate vehicle light area and the size of the candidate vehicle light area on the basis of the coordinate of the pixel point included in the candidate vehicle light area, and classify the candidate vehicle light area into a vehicle light area set if the candidate vehicle light area meets a first preset condition. The coordinate of the pixel point may include an X coordinate value and a Y coordinate value. The first preset condition may include, for example, that the Y coordinate value of the center point is not lower than a product of a height value of the vehicle image and a second preset value (e.g., 0.6), and a ratio of the size of the candidate vehicle light area to the size of the vehicle image is greater than a third threshold (e.g., 0.0005). Here, the X coordinate value of the center point of the candidate vehicle light area may be, for example, an average value of the X coordinate values of all pixel points within the candidate vehicle light area. The Y coordinate value of the center point may be, for example, an average value of the Y coordinate values of all pixel points within the candidate vehicle light area. Moreover, the size of the candidate vehicle light area may be, for example, the total number of the pixel points included in the candidate vehicle light area. In addition, the width value and the height value of the vehicle image can be calculated on the basis of the pixel points included in the vehicle image, and the size of the vehicle image can be the product of the width value and the height value of the vehicle image. It should be noted that the second preset value and the third threshold can be modified according to actual needs, and the present embodiment does not limit the content of this aspect.

Then, the electronic device can determine whether the first target vehicle light area and the second target vehicle light area exist in the vehicle light area set. Both the ratio of the size of the first target vehicle light area to the size of the vehicle image and the ratio of the size of the second target vehicle light area to the size of the vehicle image are greater than a fourth threshold (e.g., 0.001). The absolute value of the difference between the Y coordinate value of the center point of the first target vehicle light area and the Y coordinate value of the center point of the second target vehicle light area is less than a fifth threshold (the fifth threshold may be, for example, the product of the height value of the vehicle image and a preset value, and the preset value may be, for example, 0.1). Furthermore, the X coordinate value of the center point of the first target vehicle light area and the X coordinate value of the center point of the second target vehicle light area meet one, but a different one of: not greater than the product of the width value of the vehicle image and a third preset value (e.g., 0.3), or not less than the product of the width value and a fourth preset value (e.g., 0.7). The fourth preset value is greater than the third preset value. The electronic device can determine whether the first target vehicle light area and the second target vehicle light area exist in the vehicle light area set according to the conditions required for the first target vehicle light area and the second target vehicle light area. It should be noted that the preset value, the fourth threshold, the fifth threshold, the third preset value, and the fourth preset value can be modified according to actual needs, and the present embodiment does not limit the content of this aspect.

Finally, the electronic device can determine that the vehicle indicated by the vehicle image is not braking if the electronic device determines that the first target vehicle light area and the second target vehicle light area do not exist in the vehicle light area set.

In some optional implementations of the present embodiment, the electronic device can determine a midpoint of a line connecting the center point of the first target vehicle light area and the center point of the second target vehicle light area if the electronic device determines that the first target vehicle light area and the second target vehicle light area exist in the vehicle light area set. The electronic device searches for a third target vehicle light area vertically upward from the midpoint in the second vehicle image, and determines that the vehicle is braking if the third target vehicle light area is found.

Here, assuming that the coordinate of the center point of the first target vehicle light area is (x1, y1) and the coordinate of the center point of the second target vehicle light area is (x2, y2), the coordinate of the midpoint of the line connecting the center point of the first target vehicle light area and the center point of the second target vehicle light area may be:

$$((x1+x2)/2, (y1+y2)/2).$$

As an example, for the vehicle light area other than the first target vehicle light area and the second target vehicle light area in the vehicle light area set, the electronic device can draw a minimum external geometric figure of the vehicle light area in the second vehicle image. Then, the electronic device can draw a ray vertically upward from the determined midpoint. If a geometric figure among the drawn geometric figures has an intersection point with the ray, the electronic device can determine that the third target vehicle light area is found.

Figure 3:
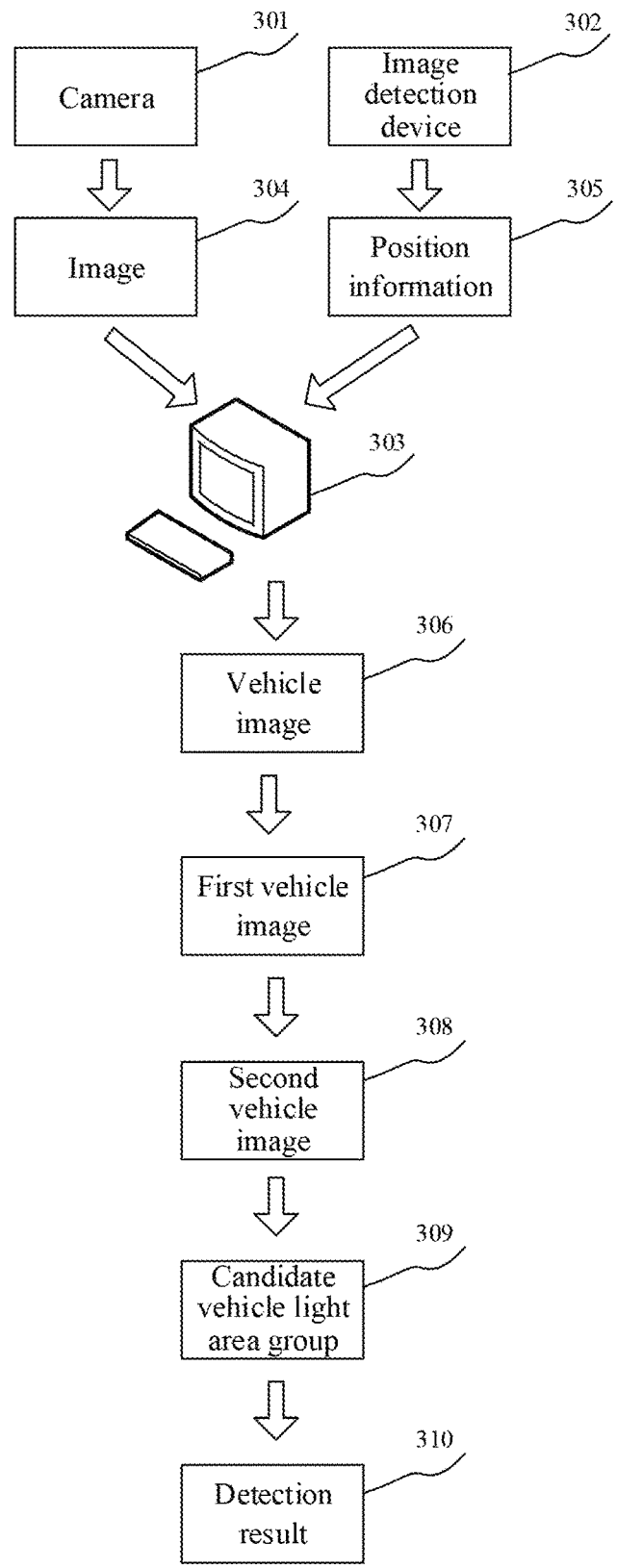
FIG. 3 is a schematic diagram of an application scenario of the method for detecting a braking behavior of a front vehicle of an autonomous vehicle according to the present disclosure.

Further referring to FIG. 3, FIG. 3 is a schematic diagram of an application scenario of the method for detecting a braking behavior of a front vehicle of an autonomous vehicle according to the present embodiment. In the application scenario of FIG. 3, the autonomous vehicle is equipped with a camera 301 for photographing a front vehicle, an image detection device 302 for detecting a vehicle area, and a terminal device 303 for detecting a braking behavior of the front vehicle. The terminal device 303 can receive an image 304 sent by the camera 301, and the image 304 includes a vehicle area. The terminal device 303 can also receive position information 305 of the vehicle area detected by the image detection device 302. Then, the terminal device 303 can cut the vehicle area from the image 304 on the basis of the position information 305 to obtain a vehicle image 306. Then, the terminal device 303 can convert the color space of the vehicle image 306 to generate a first vehicle image 307. Then, the terminal device 303 can set a pixel value of a pixel point in the first vehicle image meeting any condition in a preset condition group 307 to a first preset value to generate a second vehicle image 308. Then, the terminal device 303 can analyze the second vehicle image 308 to determine a candidate vehicle light area group 309, and a candidate vehicle light area included in the candidate vehicle light area group 309 is positioned on the left side of the second vehicle image 308. Finally, the terminal device 303 can detect, based on the candidate vehicle light area group 309, that the vehicle indicated by the vehicle image is not braking and generate a detection result 310, and the detection result includes prompt information indicating that the vehicle is not braking.

Thus, the method provided by the above embodiment of the present disclosure effectively utilizes the extraction of the vehicle image, the generation of the first vehicle image and the second vehicle image, and the determination of the candidate vehicle light area group, and improves the detection efficiency of the braking behavior of the front vehicle.

Figure 4:
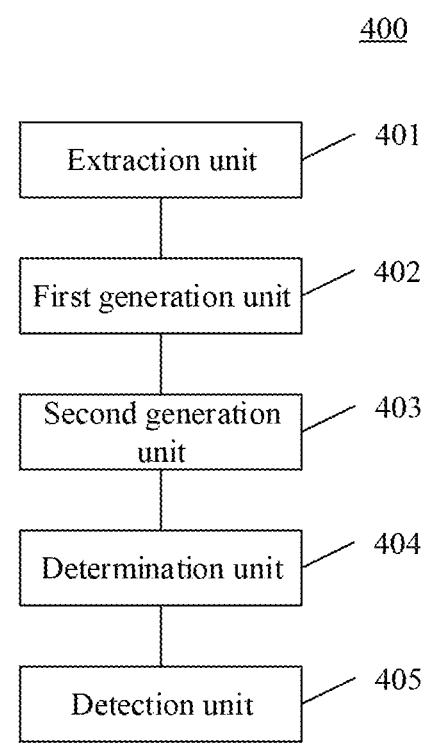
FIG. 4 is a structure diagram of an embodiment of the apparatus for detecting a braking behavior of a front vehicle of an autonomous vehicle according to the present disclosure.

Further referring to FIG. 4, as the implementation of the method shown in the above figures, the present disclosure provides an embodiment of an apparatus for detecting a braking behavior of a front vehicle of an autonomous vehicle, the embodiment of the apparatus corresponds to the embodiment of the method shown in FIG. 2, and the apparatus can be specifically applied to various types of electronic devices.

As shown in FIG. 4, the apparatus 400 for detecting a braking behavior of a front vehicle of an autonomous vehicle, shown in the present embodiment, includes an extraction unit 401, a first generation unit 402, a second generation unit 403, a determination unit 404, and a detection unit 405. The extraction unit 401 is configured for extracting a vehicle image from a vehicle area in an image acquired by the image acquisition device; the first generation unit 402 is configured for converting a color space of the vehicle image to generate a first vehicle image; the second generation unit 403 is configured for setting a pixel value of a pixel point in the first vehicle image meeting any condition in a preset condition group to a first preset value to generate a second vehicle image; the determination unit 404 is configured for analyzing the second vehicle image to determine a candidate vehicle light area group; and the detection unit 405 is configured for detecting, based on the candidate vehicle light area group, whether a vehicle indicated by the vehicle image is braking, and generating a detection result.

In the present embodiment, the specific processing of the extraction unit 401, the first generation unit 402, the second generation unit 403, the determination unit 404 and the detection unit 405 in the apparatus 400 for detecting a braking behavior of a front vehicle of an autonomous vehicle and the technical effects brought by them can refer to the related descriptions of steps 201, 202, 203, 204, and 205 in the corresponding embodiment of FIG. 2, respectively, and will not be repeated here.

In some optional implementations of the present embodiment, the first generation unit 402 may include: a converting subunit (not shown) configured for converting the color space of the vehicle image into a Hue-Saturation-Value color space.

In some optional implementations of the present embodiment, the pixel value of the pixel point may include a hue, a saturation, and a value, and the preset condition group may include at least one of: the hue is not within a preset interval, the saturation is less than a first threshold, or the value is less than a second threshold.

In some optional implementations of the present embodiment, the determination unit 404 may include: a determination subunit (not shown) configured for analyzing a connected area of the second vehicle image to obtain the candidate vehicle light area group.

In some optional implementations of the present embodiment, the detection unit 405 may include: a processing subunit (not shown) configured for, for each candidate vehicle light area in the candidate vehicle light area group, determining a coordinate of a center point of the candidate vehicle light area and a size of the candidate vehicle light area on the basis of the coordinate of the pixel point included in the candidate vehicle light area, and classifying the candidate vehicle light area into a vehicle light area set if the candidate vehicle light area meets a first preset condition, wherein the coordinate of the pixel point may include an X coordinate value and a Y coordinate value, and the first preset condition may include that the Y coordinate value of the center point is not lower than a product of a height value of the vehicle image and a second preset value, and a ratio of the size of the candidate vehicle light area to the size of the vehicle image is greater than a third threshold; a first determination subunit (not shown) configured for determining whether a first target vehicle light area and a second target vehicle light area exist in the vehicle light area set, wherein both the ratio of the size of the first target vehicle light area to the size of the vehicle image and the ratio of the size of the second target vehicle light area to the size of the vehicle image are greater than a fourth threshold, an absolute value of the difference between the Y coordinate value of the center point of the first target vehicle light area and the Y coordinate value of the center point of the second target vehicle light area is less than a fifth threshold, and the X coordinate value of the center point of the first target vehicle light area and the X coordinate value of the center point of the second target vehicle light area meet one, but a different one of: not greater than a product of a width value of the vehicle image and a third preset value, or not less than a product of the width value and a fourth preset value; and a second determination subunit (not shown) configured for determining that the vehicle is not braking if the first target vehicle light area and the second target vehicle light area do not exist in the vehicle light area set.

In some optional implementations of the present embodiment, the detection unit 405 may further include: a third determination subunit (not shown) configured for determining a midpoint of a line connecting the center point of the first target vehicle light area and the center point of the second target vehicle light area if the first target vehicle light area and the second target vehicle light area exist in the vehicle light area set; and a search subunit configured for searching for a third target vehicle light area vertically upward from the midpoint in the second vehicle image, and determining that the vehicle is braking if the third target vehicle light area is found.

Figure 5:
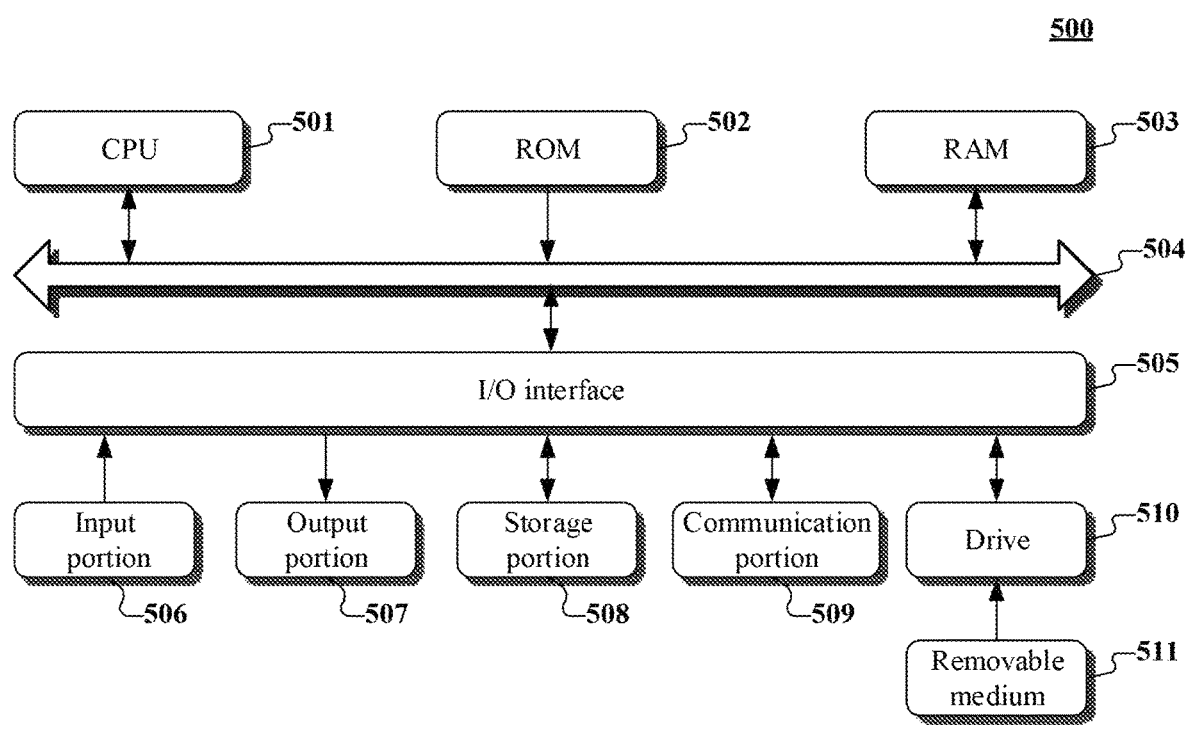
FIG. 5 is a structure diagram of a computer system of an electronic device suitable for implementing the embodiments of the present disclosure.

Referring to FIG. 5, a schematic structural diagram of a computer system 500 adapted to implement the electronic device of the embodiments of the present application is shown. The electronic device shown in FIG. 5 is merely an example and should not impose any restriction on the function and scope of use of the embodiments of the present application.

As shown in FIG. 5, the computer system 500 includes a central processing unit (CPU) 501, which may execute various appropriate actions and processes in accordance with a program stored in a read-only memory (ROM) 502 or a program loaded into a random access memory (RAM) 503 from a storage portion 508. The RAM 503 also stores various programs and data required by operations of the system 500. The CPU 501, the ROM 502 and the RAM 503 are connected to each other through a bus 504. An input/output (I/O) interface 505 is also connected to the bus 504.

The following components are connected to the I/O interface 505: an input portion 506 including a keyboard, a mouse etc.; an output portion 507 comprising a cathode ray tube (CRT), a liquid crystal display device (LCD), a speaker etc.; a storage portion 508 including a hard disk and the like; and a communication portion 509 comprising a network interface card, such as a LAN card and a modem. The communication portion 509 performs communication processes via a network, such as the Internet. A drive 510 is also connected to the I/O interface 505 as required. A removable medium 511, such as a magnetic disk, an optical disk, a magneto-optical disk, and a semiconductor memory, may be installed on the drive 510, to facilitate the retrieval of a computer program from the removable medium 511, and the installation thereof on the storage portion 508 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 509, and/or may be installed from the removable media 511. The computer program, when executed by the central processing unit (CPU) 501, implements the above mentioned functionalities as defined by the methods of the present disclosure.

It should be noted that the computer readable medium in the present disclosure may be computer readable storage medium. An example of the computer readable storage medium may include, but not limited to: semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. The computer readable medium may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in the embodiments of the present application may be implemented by means of software or hardware. The described units or modules may also be provided in a processor, for example, described as: a processor, comprising an extraction unit, a first generation unit, a second generation, a determination unit, and a detection unit, where the names of these units or modules do not in some cases constitute a limitation to such units or modules themselves. For example, the extraction unit may also be described as "a unit for extracting a vehicle image from a vehicle area."

In another aspect, the present application further provides a non-transitory computer-readable storage medium. The non-transitory computer-readable storage medium may be the non-transitory computer-readable storage medium included in the apparatus in the above described embodiments, or a stand-alone non-transitory computer-readable storage medium not assembled into the apparatus. The non-transitory computer-readable storage medium stores one or more programs. The one or more programs, when executed by a device, cause the device to: extract a vehicle image from a vehicle area in an image acquired by the image acquisition device; convert a color space of the vehicle image to generate a first vehicle image; set a pixel value of a pixel point in the first vehicle image meeting any condition in a preset condition group to a first preset value to generate a second vehicle image; analyze the second vehicle image to determine a candidate vehicle light area group; and detect, based on the candidate vehicle light area group, whether a vehicle indicated by the vehicle image is braking, and generate a detection result.

The above description only provides an explanation of the preferred embodiments of the present application and the technical principles used. It should be appreciated by those skilled in the art that the inventive scope of the present application is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present application are examples.

What is claimed is:

1. A method for detecting a braking behavior of a front vehicle of an autonomous vehicle, an image acquisition device being mounted on the autonomous vehicle, the method comprising:

extracting a vehicle image from a vehicle area in an image captured by the image acquisition device mounted on the autonomous vehicle;

converting a color space of the vehicle image to generate a first vehicle image;

setting a pixel value of a pixel point in the first vehicle image meeting any condition in a preset condition group to a first preset value to generate a second vehicle image;

analyzing the second vehicle image to determine a candidate vehicle light area group; and detecting, based on the candidate vehicle light area group, whether a vehicle indicated by the vehicle image is braking, and generating a detection result.

2. The method according to claim 1, wherein the converting a color space of the vehicle image comprises:

converting the color space of the vehicle image into a Hue-Saturation-Value color space.

3. The method according to claim 2, wherein the pixel value of the pixel point comprises a hue, a saturation, and a value, and the preset condition group comprises at least one of: the hue is not within a preset interval, the saturation is less than a first threshold, or the value is less than a second threshold.

4. The method according to claim 1, wherein the analyzing the second vehicle image to determine a candidate vehicle light area group comprises:

analyzing a connected area of the second vehicle image to obtain the candidate vehicle light area group.

5. The method according to claim 1, wherein the detecting, based on the candidate vehicle light area group, whether a vehicle indicated by the vehicle image is braking comprises:

for each candidate vehicle light area in the candidate vehicle light area group, determining a coordinate of a center point of the candidate vehicle light area and a size of the candidate vehicle light area on the basis of the coordinate of the pixel point included in the candidate vehicle light area, and classifying the candidate vehicle light area into a vehicle light area set if the candidate vehicle light area meets a first preset condition, wherein the coordinate of the pixel point includes an X coordinate value and a Y coordinate value, and the first preset condition comprises that the Y coordinate value of the center point is not lower than a product of a height value of the vehicle image and a second preset value, and a ratio of the size of the candidate vehicle light area to the size of the vehicle image is greater than a third threshold;

determining whether a first target vehicle light area and a second target vehicle light area exist in the vehicle light area set, wherein both the ratio of the size of the first target vehicle light area to the size of the vehicle image and the ratio of the size of the second target vehicle light area to the size of the vehicle image are greater than a fourth threshold, an absolute value of a difference between the Y coordinate value of the center point of the first target vehicle light area and the Y coordinate value of the center point of the second target vehicle light area is less than a fifth threshold, and the X coordinate value of the center point of the first target vehicle light area and the X coordinate value of the center point of the second target vehicle light area meet one, but a different one of: not greater than a product of a width value of the vehicle image and a third preset value, or not less than a product of the width value and a fourth preset value; and determining that the vehicle is not braking if the first target vehicle light area and the second target vehicle light area do not exist in the vehicle light area set.

6. The method according to claim 5, wherein the detecting, based on the candidate vehicle light area group, whether a vehicle indicated by the vehicle image is braking further comprises:

determining a midpoint of a line connecting the center point of the first target vehicle light area and the center point of the second target vehicle light area if the first target vehicle light area and the second target vehicle light area exist in the vehicle light area set; and searching for a third target vehicle light area vertically upward from the midpoint in the second vehicle image, and determining that the vehicle is braking if the third target vehicle light area is found.

7. An apparatus for detecting a braking behavior of a front vehicle of an autonomous vehicle, an image acquisition device being mounted on the autonomous vehicle, the apparatus comprising:

at least one processor; and a memory storing instructions, the instructions when executed by the at least one processor, cause the at least one processor to perform operations, the operations comprising:

extracting a vehicle image from a vehicle area in an image captured by the image acquisition device mounted on the autonomous vehicle;

converting a color space of the vehicle image to generate a first vehicle image;

setting a pixel value of a pixel point in the first vehicle image meeting any condition in a preset condition group to a first preset value to generate a second vehicle image;

analyzing the second vehicle image to determine a candidate vehicle light area group; and detecting, based on the candidate vehicle light area group, whether a vehicle indicated by the vehicle image is braking, and generating a detection result.

8. The apparatus according to claim 7, wherein the converting a color space of the vehicle image comprises:

converting the color space of the vehicle image into a Hue-Saturation-Value color space.

9. The apparatus according to claim 8, wherein the pixel value of the pixel point comprises a hue, a saturation, and a value, and the preset condition group comprises at least one of: the hue is not within a preset interval, the saturation is less than a first threshold, or the value is less than a second threshold.

10. The apparatus according to claim 7, wherein the analyzing the second vehicle image to determine a candidate vehicle light area group comprises:

analyzing a connected area of the second vehicle image to obtain the candidate vehicle light area group.

11. The apparatus according to claim 7, wherein the detecting, based on the candidate vehicle light area group, whether a vehicle indicated by the vehicle image is braking comprises:

for each candidate vehicle light area in the candidate vehicle light area group, determining a coordinate of a center point of the candidate vehicle light area and a size of the candidate vehicle light area on the basis of the coordinate of the pixel point included in the candidate vehicle light area, and classifying the candidate vehicle light area into a vehicle light area set if the candidate vehicle light area meets a first preset condition, wherein the coordinate of the pixel point includes an X coordinate value and a Y coordinate value, and the first preset condition comprises that the Y coordinate value of the center point is not lower than a product of a height value of the vehicle image and a second preset value, and a ratio of the size of the candidate vehicle light area to the size of the vehicle image is greater than a third threshold;

determining whether a first target vehicle light area and a second target vehicle light area exist in the vehicle light area set, wherein both the ratio of the size of the first target vehicle light area to the size of the vehicle image and the ratio of the size of the second target vehicle light area to the size of the vehicle image are greater than a fourth threshold, an absolute value of a difference between the Y coordinate value of the center point of the first target vehicle light area and the Y coordinate value of the center point of the second target vehicle light area is less than a fifth threshold, and the X coordinate value of the center point of the first target vehicle light area and the X coordinate value of the center point of the second target vehicle light area meet one, but a different one of: not greater than a product of a width value of the vehicle image and a third preset value, or not less than a product of the width value and a fourth preset value; and determining that the vehicle is not braking if the first target vehicle light area and the second target vehicle light area do not exist in the vehicle light area set.

12. The apparatus according to claim 11, wherein the detecting, based on the candidate vehicle light area group, whether a vehicle indicated by the vehicle image is braking further comprises:

determining a midpoint of a line connecting the center point of the first target vehicle light area and the center point of the second target vehicle light area if the first target vehicle light area and the second target vehicle light area exist in the vehicle light area set; and searching for a third target vehicle light area vertically upward from the midpoint in the second vehicle image, and determining that the vehicle is braking if the third target vehicle light area is found.

13. A non-transitory computer-readable storage medium storing a computer program, the computer program when executed by one or more processors, causes the one or more processors to perform operations, the operations comprising:

extracting a vehicle image from a vehicle area in an image captured by the image acquisition device mounted on the autonomous vehicle;

converting a color space of the vehicle image to generate a first vehicle image;

setting a pixel value of a pixel point in the first vehicle image meeting any condition in a preset condition group to a first preset value to generate a second vehicle image;

analyzing the second vehicle image to determine a candidate vehicle light area group; and detecting, based on the candidate vehicle light area group, whether a vehicle indicated by the vehicle image is braking, and generating a detection result.

* * * * *